Patented Feb. 12, 1952

2,585,014

UNITED STATES PATENT OFFICE 2,585,014

HIGH-VOLTAGE RECTIFIER DISK

Merlin O. Juvrud, Nutley, N. J., assignor to Federal Telephone and Radio Corporation, New York, N. Y., a corporation of Delaware No Drawing. Application October 26, 1945, Serial No. 624,946

7 Claims. (Cl. 175—366)

The present invention refers to high voltage rectifier discs and in particular to a method for producing a barrier layer on the selenium layer.

It is known that a rectifier disc of this type comprises a base plate, bearing a selenium layer and an overlying counterelectrode layer. In order to improve the rectifier characteristics, it has been suggested before to treat the selenium layer with a lacquer before applying the counterelectrode. This application of the lacquer had the advantage that the rectifier elements could be used for higher voltages than before, apparently due to the fact that the lacquer provided a good and efficient barrier layer. However, it was difficult to achieve exactly the rectifier characteristics which may be desired for particular purposes merely by this lacquer treatment.

It is the main object of the present invention to provide an improved barrier layer on the selenium having superior rectifier characteristics particularly concerning the ratio of forward and reverse current passed by the rectifier.

This object is achieved by adding a cadmium salt as an ingredient to a volatile organic carrier medium inert to selenium, as a varnish or lacquer, and applying the mixture to the selenium to produce, upon evaporation of the carrier, a residual organic layer containing the cadmium salt which constitutes a barrier layer alternatively, a cadmium salt in alcohol solution, preferably ethyl alcohol in concentrations of the salt ranging from ½ to 20% may be used.

Although any cadmium salt can be used in this manner for producing the barrier layer, it is preferred to use cadmium nitrate, cadmium chloride, cadmium sulphate, cadmium bromide, cadmium iodide, cadmium acetate, or cadmium selenide, and in some instances more than one cadmium salt can be used. If the cadmium salt is used as an additive to a carrier medium, it is to be added to the medium in an amount of 1 to 20% based on total weight.

It has been found that a concentration of 5% of cadmium salt in the alcohol solution is to be preferred for good results, although this concentration of the cadmium salt or salts may be varied to modify predetermined characteristics of the rectifier so that the rectifier may be better suited for use at a desired voltage level. As stated before the volatile carrier may be a lacquer, varnish or the like, but also may comprise a mixture of the mentioned cadmium salt solution, with a solution of 5% cellulose acetate in methyl ethylene glycol mono-methyl ether acetate, known under the trade name of Methyl Cello-solve Acetate, and methyl ethylene glycol mono-methyl ether acetate. The proportions of the three components of this last mixture will vary depending upon the forward and reverse characteristics which it is desired to produce and the cadmium salt solution proportionately as the reverse characteristic is to be modified. As stated before the cadmium salt ingredient is present in the alcohol solution in a range of 1 to 20%, and it has been found that addition of 20% of this solution to the volatile carrier medium, such as a varnish or lacquer, presents about the maximum amount which can be used without damaging the forward characteristic of the finished rectifier. If the proportion of the solution is raised above this value, the treatment will not result in a further improvement of the reverse characteristic of the rectifier, and furthermore the forward characteristic, which remained in desirable limits with use of proportions up to 20% will become worse as this value is exceeded raising the percentage of the solution beyond 20%. Experience teaches that when processing discs which are designed for 26 volts or below, the 20% proportion of the cadmium salt solution will necessarily remain the maximum addition of cadmium salt solution, but discs designed for use at more than 26 volts at a low current can be treated with higher concentrations of cadmium salt even to the point that the cadmium salt solution alone is applied to produce the barrier layer.

*Example 1*

10% of a solution of cadmium nitrate in ethyl alcohol (5% salt concentration) is added to 90% of a lacquer such as is commonly used for treating rectifier discs, and this solution is then applied to the discs in the usual manner.

*Example 2*

One part of a solution of cadmium nitrate in ethyl alcohol (5% salt concentration) is added to five parts of a 5% solution of cellulose acetate in methyl ethylene glycol mono-methyl ether acetate, and five parts of methyl ethylene glycol mono-methyl ether acetate, and this solution is then applied to the discs in the usual manner.

It is of advantage to apply the improved lacquer to the disc after the second heat treatment.

While I have disclosed the principles of my invention in connection with several different embodiments, it will be understood that these embodiments are given by way of example only and not as limiting the scope of the invention as set forth in the objects and the appended claims.

What I claim is:

1. In a process for manufacturing selenium rectifier elements the step that comprises applying to the selenium surface before application of the counter-electrode, a lacquer containing cadmium nitrate.

2. In a process for manufacturing selenium rectifier elements the step that comprises applying to the selenium surface before application of the counter-electrode, a lacquer containing cadmium chloride.

3. In a process for manufacturing selenium rectifier elements the step that comprises applying to the selenium surface before application of the counter-electrode, a lacquer containing cadmium sulphate.

4. In a rectifier disc comprising a base plate, a selenium layer and a counter-electrode, a barrier layer between said selenium layer and said counter-electrode, said barrier layer comprising the residue obtained by evaporating a mixture comprising one part of a cadmium salt ethyl alcohol solution having a salt concentration ranging from ½% to 20%, 5 parts of about 5% solution of cellulose acetate in methyl ethylene, glycol, mono-methyl, ether acetate and about 5 parts of methyl ethylene glycol, mono-methyl, ether acetate.

5. In a rectifier disc comprising a base plate, a selenium layer and a counter-electrode, a barrier layer between said selenium layer and said counter-electrode, said barrier layer comprising a residual organic layer containing cadmium nitrate.

6. In a rectifier disc comprising a base plate, a selenium layer and a counter-electrode, a barrier layer between said selenium layer and said counter-electrode, said barrier layer comprising a residual organic layer containing cadmium chloride.

7. In a rectifier disc comprising a base plate, a selenium layer and a counter-electrode, a barrier layer between said selenium layer and said counter-electrode, said barrier layer comprising a residual organic layer containing cadmium bromide.

MERLIN O. JUVRUD.

REFERENCES CITED

The following references are of record in the file of this patent:

UNITED STATES PATENTS

| Number | Name | Date |
|---|---|---|
| 2,137,316 | Van Geel | Nov. 22, 1938 |
| 2,173,249 | De Boer et al. | Sept. 19, 1939 |
| 2,193,610 | Wilson | Mar. 12, 1940 |
| 2,328,440 | Esseling | Aug. 31, 1943 |
| 2,362,545 | Ellis et al. | Nov. 14, 1944 |
| 2,426,242 | Saslaw | Aug. 26, 1947 |
| 2,433,402 | Saslaw | Dec. 30, 1947 |
| 2,452,603 | Saslaw | Nov. 2, 1948 |
| 2,459,848 | Stateman | Jan. 25, 1949 |